United States Patent [19]
Chromy

[11] 3,951,034
[45] Apr. 20, 1976

[54] STRADDLING DOWEL

[75] Inventor: Franz Chromy, Feldkirch-Levis, Austria

[73] Assignee: Hilti Aktiengesellschaft, Schaan, Liechtenstein

[22] Filed: June 25, 1974

[21] Appl. No.: 482,859

[30] Foreign Application Priority Data
July 5, 1973 Germany............................ 2334283

[52] U.S. Cl. .................................... 85/79; 85/72; 85/87
[51] Int. Cl.² ........................................ F16B 13/04
[58] Field of Search .............. 85/79, 87, 86, 74, 73, 85/75, 64, 72

[56] References Cited
UNITED STATES PATENTS

| 1,316,640 | 9/1919 | Parsons | 85/79 |
| 3,262,353 | 7/1966 | Waeltz et al. | 85/72 |
| 3,301,123 | 1/1967 | Worley | 85/79 |
| 3,425,312 | 2/1969 | McCauley | 85/79 X |
| 3,478,640 | 11/1969 | Elders | 85/79 X |

Primary Examiner—Ramon S. Britts
Attorney, Agent, or Firm—Toren, McGeady and Stanger

[57] ABSTRACT

A straddling dowel includes at least a pair of shell members each having a first contact surface and a second contact surface. The first contact surfaces are disposed in contact with one another and extend in parallel with the axis of the dowel and the second contact surfaces are disposed in contact with one another and extend helically relative to the axis of the dowel. The first and second contact surfaces extend for substantially the entire axial length of the shell members.

13 Claims, 5 Drawing Figures

STRADDLING DOWEL

SUMMARY OF THE INVENTION

The present invention is directed to a straddling dowel including at least two expanding shell members which can be displaced relative to one another along common contact surfaces.

Straddling dowels are known which include expanding shells that can be displaced relative to one another with the contact surfaces between the shells disposed in a plane inclined to the dowel axis. Such expanding shell members have a wedge-like form.

When the shell members in such a dowel are pushed toward one another by some external force, the inclined contact surfaces push against each other and effect a radial displacement of the shell members in one plane. The outer contour of the dowel is widened in a single plane, so that, when the dowel is inserted in a bore hole, the shell members are pressed against the wall of the bore hole for effecting anchoring engagement.

As mentioned above, the outer surface of this dowel is widened only in one plane. Such a dowel arrangement has the disadvantage that it is locked into a bore hole only on two opposite sides with the result that the surface pressure in the bore hole becomes excessive and its wall surface tends to crumble at the most stressed points and, as a result, there is no friction contact between the expanded shell members and the bore hole. With such irregular load distribution there is a substantial reduction in the extraction values of these known dowels. Apart from the extraction values, these dowels are extremely susceptible to transverse load, due to the spreading action in two directions in the same plane, with the resulting irregular distribution of the anchoring forces.

The primary object of the present invention is to provide a straddling dowel which assures uniform distribution of the anchoring forces and thus maximum extraction values by utilizing the entire surface area of the dowel.

In accordance with the present invention each of the shell members forming the dowel has a pair of contact surfaces in contact with similarly oriented surfaces on another shell member and each shell member has one contact surface extending in parallel with the axis of the dowel and another contact surface which extends helically relative to the axis of the dowel.

When the shell members of the dowel are pushed together, the helically directed contact surfaces strike one another and the shell members tend to turn about the dowel axis. This tendency to rotate is counteracted by the axially extending contact surfaces which merely permit an axial displacement of the shell members. Due to the blocked rotary movement developed within the shell members, they widen radially over their entire circumference. Accordingly, the outer contour of the shell members undergoes a radial expansion distributed uniformly over the entire dowel length, as well as over its entire circumference. With such a dowel arrangement, the anchoring forces are distributed uniformly over the circumference and length of the bore hole, so that extremely high anchoring forces are developed and the dowel is insusceptible to transverse forces.

A particularly effective radial expansion of the shell members is attained by employing an angle of inclination or slope of the helical contact surfaces in the range of 40° to 75°.

The uniform distribution of the anchoring forces over the axial length of the shell members is particularly ensured when the helical contact surfaces extend for at least a major part of the axial length of the shell members and it is preferable if they extend for the entire axial length. To ensure a uniform distribution of the expanding force within the bore hole over the entire circumference of the expanding shells, it is preferable if the helical contact surfaces of the shell members extend for between three-quarters and a full turn relative to the dowel axis. It is desirable to achieve a maximum expansion of the shell members to afford a certain independence of the bore hole diameter. This maximumm desired radial variability of the diameter depends on the mutual axial displaceability of the expanding shell members. To keep the axial displaceability as great as possible, the ends of the shell members which intersect the parallel and helical contact surfaces thereof are disposed substantially perpendicularly of the dowel axis.

The contact surfaces of the shell members disposed in parallel with the dowel axis extend preferably for the entire length of the shell members, so that a uniform force distribution is attained over the entire axial length of the shell members.

The displacement of the shell members relative to one another can be effected in various ways, in one arrangement, if a blind bore hole is available, the expanding shell members alone can be introduced into the bore hole and, with one shell member placed against the base of the bore hole, the other shell member can be driven in with the contact surfaces in engagement so that the desired radial expansion and anchoring effect is obtained. If an article of some type is to be attached to the surface containing the bore hole, a threaded member can be inserted into a female thread or diameter constriction formed in the inner end region of one of the shell members. The female thread portion can be formed in one of the expanding shell members itself or a separate sleeve can be fixed to a shell member or can be inserted into the bottom of the bore hole inwardly of the shell members.

If a diameter constriction is provided in one of the expanding shell members, an ordinary wood screw can be used for fastening objects, since it cuts its own thread within the diameter constriction. If a collar or head is available at the outer end of the threaded bar, wood screw, or the like, which is introduced into the dowel, the threading in of the bar or screw can be used to displace the shell members completely or partly relative to one another.

To obtain the axial displacement of wood screws through the dowel, it is possible to bend over one end face of a shell member so that an annular constriction is formed. If this bent-over end face is slightly inclined to the dowel axis, a thread serving for engagement with the wood screw is formed automatically.

To achieve the axial displacement of the shell members independently of the depth of the bore hole, it is preferable if the shell members are arranged on a threaded bolt with the shell members extending between the head of the bolt at one end and a washer and nut on the opposite threaded end. By threading the nut onto the bolt toward the head, the expanding action of the shell members can be obtained. As indicated, washers, distance rings and the like can be arranged between the nut and the adjoining end of the shell members. To maintain the portion of the bolt which projects from the bore hole as small as possible, the bolt can be provided with a preset breaking point within the range of its threaded surface, so that, after the nut is threaded for the full extent on the bolt, the projecting portion of the bolt can be broken off.

To facilitate the storage, transportation and assembling of the straddling dowels embodying the present invention, the shell members, especially if they are not mounted on a bolt or the like, can be held together by separate means extending about their circumference. For example, wire or spring rings can be used. However, a particularly inexpensive and expedient method involves the use of an adhesive tape wrapped around the shell members. Such adhesive tape can also be used as a label containing model designation, assembly instructions and the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
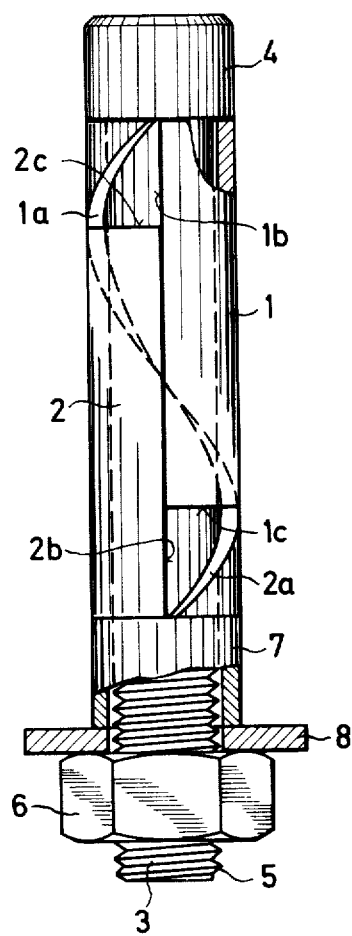
FIG. 1 is a side view of a dowel, partly in section, incorporating a threaded bolt and embodying the present invention.
Figure 2:
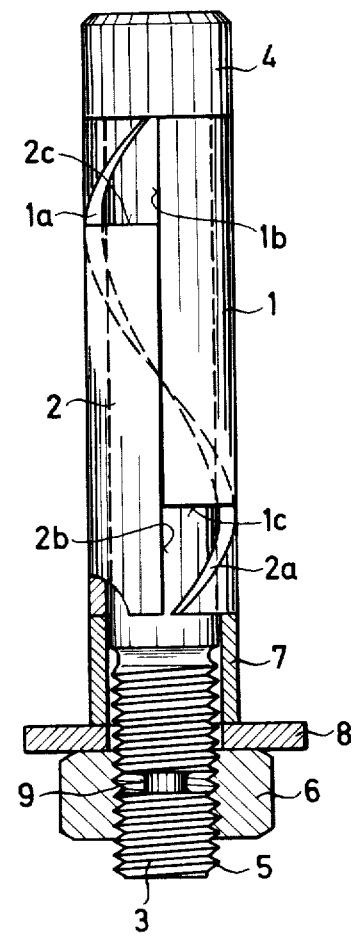
FIG. 2 is a view of a dowel similar to FIG. 1, of another embodiment of the invention including a preset breaking point in the bolt.

In FIGS. 1 and 2 the straddling dowel consists of a pair of shell members 1 and 2 mounted on a threaded bolt 3 which extends axially through the shell members. The threaded bolt 3 provides a head or abutment 4 on one end and the opposite end has a nut 6 mounted on a thread 5. As can be seen in the drawing, the shell member 1 extends from contact with the abutment 4 to a plane spaced axially from a spacer sleeve 7 while the shell member 2 is in contact at one end with the spacer sleeve 7 and is spaced at its other end from the abutment 4. Accordingly, the nut 6 is in engagement with a washer 8 which, in turn, is in contact with the opposite end of the spacer sleeve 7 from the end which contacts the shell member 2. As can be seen in FIG. 1, each of the shell members have first contact surfaces 1a, 2a which extend helically about the axis of the dowel and second contact surfaces 1b, 2b which extend in parallel relation with the dowel axis. In addition, the ends of the shell in which the contact surfaces terminate are disposed perpendicularly to the dowel axis. The intersection of the end surfaces with the contacting surfaces on the shell members provide a pointed construction.

As indicated above, the straddling dowel shown in FIG. 2 is similar to that shown in FIG. 1; however, a preset breakoff point 9 is provided in the threaded portion 5. This preset breakoff point facilitates the removal of the end of the bolt, particularly if it projects from the bore hole after the desired fastening is achieved. The spacer sleeve can be formed of a variety of materials, such as metals or plastics.

Figure 3:
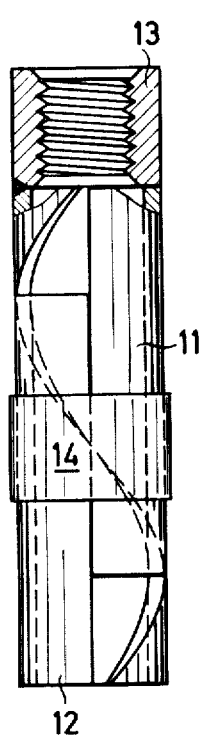
FIG. 3 is another embodiment of the dowel shown in side view and partial section with a female thread formed within the dowel.

In FIG. 3 another straddling dowel is shown which consists of two shell members 11, 12 of substantially the same construction as those shown in FIGS. 1 and 2. In this arrangement, a threaded bush or sleeve 13 is secured to the upper of the two sleeve members by spot welding. The threaded bush serves to receive threaded members, not shown. The shell members 11, 12 are held together in this embodiment by an adhesive tape 14.

Figure 4:
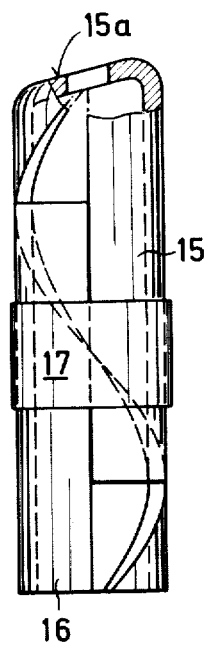
FIG. 4 is still another embodiment of the dowel of the present invention suitable for use with a wood screw.
Figure 5:
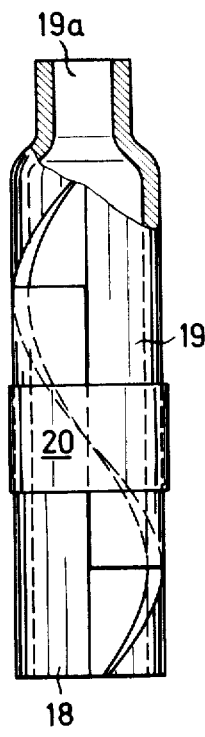
FIG. 5 is yet another dowel in accordance with the present invention, also suitable for use with a wood screw.

In FIGS. 4 and 5, dowels are shown embodying the principle of the present invention, which are particularly suitable for lighter fastening needs and are designed for use with wood screws as the fastening members.

Accordingly, in FIG. 4 the dowel consists of a pair of shell members 15, 16. The shell member 15 has its upper end 15a bent inwardly and shaped in an annular manner so that it is inclined at an acute angle with the dowel axis. Due to the annular bent portion 15a being disposed in an inclined plane to the dowel axis, when a wood screw is introduced into the dowel it automatically forms a screw thread in the bent end 15a. In this dowel arrangement, an adhesive tape 17 holds the shell members 15, 16 together and they have substantially the same arrangement of the contact surfaces as shown in FIGS. 1 and 2.

In FIG. 5 the dowel is similar to that in FIG. 4, being composed of the shell members 18 and 19 which are held together by an adhesive tape 20. The upper end of shell member 19 is necked down into a reduced diameter sleeve as compared to the dowel diameter so that an expanding screw introduced into the sleeve cuts its own thread.

While specific embodiments of the invention have been shown and described in detail to illustrate the application of the inventive principles, it will be understood that the invention may be embodied otherwise without departing from such principles.

I claim:

1. An axially extending straddling dowel comprising an axially extending shell, said shell comprising at least two axially extending expanding shell members displaceable relative to one another in the axial direction along common contact surfaces, wherein the improvement comprises that each said shell member has a first contact surface and a second contact surface with each of said first and second contact surfaces extending generally in the axial direction of the dowel, said first contact surfaces being disposed in contact with one another and extending helically relative to the axis of the dowel and extending for at least a major part of the axial length of said shell members and said second contact surfaces being disposed in contact with one another and in parallel relation with the axis of the dowel and extending for at least a major part of the axial length of said shell members and means in cooperative engagement with at least one of said shell members for axially displacing the at least one of said shell members relative to the other with said shell members arranged to expand radially outwardly relative to the axis of said shell for affording an expanding anchoring effect.

2. A straddling dowel, as set forth in claim 1, wherein said first contact surfaces are arranged at a slope angle in the range of 40° to 75°.

3. A straddling dowel, as set forth in claim 2, wherein said first contact surfaces extend for the axial length of the expanding shell members.

4. A straddling dowel, as set forth in claim 2, wherein said first contact surfaces extend about the axis of the dowel in the range of from three-quarters to one full turn.

5. A straddling dowel, as set forth in claim 1, wherein said first contact surfaces and second contact surfaces terminate in end surfaces extending perpendicularly to said second contact surfaces and the axis of the dowel.

6. A straddling dowel, as set forth in claim 1, wherein said second contact surfaces extend substantially for the entire axial length of said shell members.

7. A straddling dowel, as set forth in claim 1, wherein said means includes a sleeve member having a female thread therein secured to the end of one of said shell member.

8. A straddling dowel, as set forth in claim 1, wherein said means comprises that one of said shell members at one end has an annularly shaped inwardly directed wall forming a diameter constriction relative to the diameter of the remainder of such shell member.

9. A straddling dowel, as set forth in claim 1, wherein said means comprises that one of said shell members at an end thereof is necked downwardly into an axially centered axially extending tubular section.

10. A straddling dowel, as set forth in claim 1, wherein said means comprises a bolt having a head on one end arranged to extend through said shell members, the head of said bolt having a diameter at least greater than the inside diameter of said shell members, the opposite end of said dowel from the head being threaded, a sleeve mounted on said bolt adjacent said threaded end thereof and disposed in contact with the end of one of said shell members, a washer mounted on said bolt in contact with the end of said sleeve spaced from said shell member, and a nut threaded on said bolt and arranged to hold said washer and sleeve against the end of said shell member.

11. A straddling bolt, as set forth in claim 10, wherein said bolt has a preset breakoff point in the range of its threaded end.

12. A straddling bolt, as set forth in claim 1, including means for holding said shell members together with said first contact surfaces and said second contact surfaces in contact engagement.

13. A straddling dowel, as set forth in claim 12, wherein said holding means comprises an adhesive tape encircling the outer circumferential periphery of said sleeve members.

* * * * *